United States Patent [19]

Nakayama

[11] Patent Number: 4,635,101
[45] Date of Patent: Jan. 6, 1987

[54] IMAGE CONVERSION APPARATUS FOR TELEVISION SIGNALS
[75] Inventor: Yoshiaki Nakayama, Tokyo, Japan
[73] Assignee: Fuji Photo Film Co., Ltd., Kanagawa, Japan
[21] Appl. No.: 600,814
[22] Filed: Apr. 16, 1984
[30] Foreign Application Priority Data Apr. 19, 1983 [JP] Japan .................................. 58-67750

[51] Int. Cl.$^4$ .............................................. H04N 9/74
[52] U.S. Cl. .................................... 358/21 R; 358/22; 358/76
[58] Field of Search ................... 358/21 R, 22, 76, 78, 358/80

[56] References Cited
U.S. PATENT DOCUMENTS 4,393,398 7/1983 Horiguchi ............................. 358/76
4,463,373 7/1984 Mikami ................................ 358/76

FOREIGN PATENT DOCUMENTS 0021734 2/1983 Japan ................................... 358/176

Primary Examiner—Michael A. Masinick
Attorney, Agent, or Firm—Birch, Stewart, Kolasch and Birch

[57] ABSTRACT

An apparatus for converting a negative image on a negative recording medium to a positive image includes a first converter for converting a composite video signal into its luminance and color difference components. A first processor electronically inverts the luminance signal while a second processor electronically inverts the luminance and color difference components together resulting in second luminance and second color difference signals. The second luminance and second color difference signals are encoded to produce a second video signal which is a positive image having corrected brightness and white balance.

17 Claims, 12 Drawing Figures

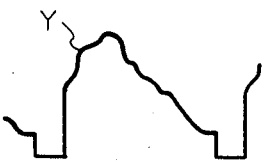
Fig. 3A
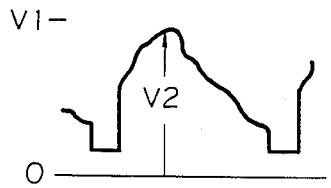
Fig. 3B
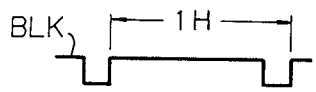
Fig. 3C
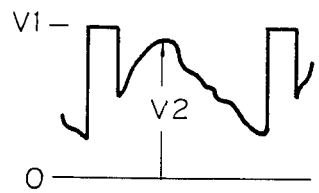
Fig. 3D
Fig. 4
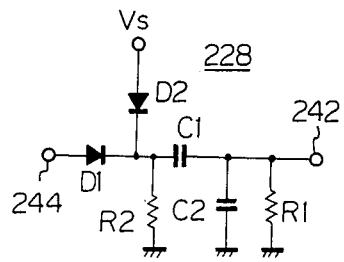
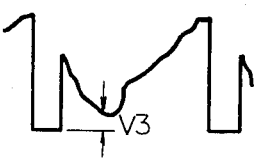
Fig. 3E
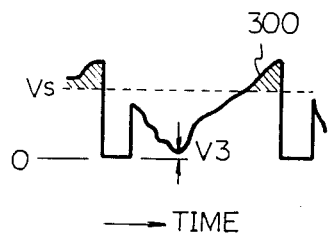
Fig. 3F (SLICING & INTEGRATION)   (WHITE PEAK CONTROL)

(SLICING & INTEGRATION)   (TOTAL INTEGRATION)

IMAGE CONVERSION APPARATUS FOR TELEVISION SIGNALS

BACKGROUND OF THE INVENTION

The present invention relates to an imaging system, particularly, to a negative-to-positive conversion apparatus for television signals, in which signals representative of a negative image as recorded on a negative recording medium, such as a color negative film, are converted into television signals representative of a positive image associated therewith.

Where a negative image recorded on a color negative is imaged by an imaging device, such as a color television camera, in order to produce a positive image associated therewith, it was common in the prior art that signals developed from the imaging device and representative of a negative color image are separated into separate color signals, which are in turn inverted in color and brightness to form a positive image associated therewith.

Recent developments in television cameras are directed to inclusion of integrated circuitry for of compactness and power savings. It is common in commercially available, integrated circuit color telelvision cameras that the integrated circuit chip involved therein is so designed as to produce luminance, Y, signals, and color difference signals, such as B-Y and R-Y, where B and R represents blue and red signals, respectively, rather than separated color signals, such as red, green (G) and blue.

For negative-to-positive conversion by means of luminance and color difference signals, in general, there are conventionally three techniques used: one is respective inversion made on those luminance and color difference signals; another is inversion of luminance signals with 180 angular degrees of shift in phase made on color subcarriers of composite color video signals; and the other is inversion of luminance signals with 180 angular degrees of shift in phase made on a color burst of composite color video signals. Those techniques are, however, disadvantageous in the provision of sophisticated circuitry required for accomplishing color correction on video signals representative of a negative image.

In general, color negative film is exposed under various lighting conditions with less correction made on color temperature during exposure. It is therefore necessary to correct color temperature on the images under negative-to-positive conversion.

In order to accomplish color temperature correction under a variety of lighting conditions, it is required to make such correction on at least two sorts of color components resolved from the images in question. Conventionally, there is used a color temperature correction system including a color monitor device, such as a cathode-ray tube display, displaying thereon an image, and two series of knobs, red and blue, and green and purple, which knobs are manipulated by an operator so as to control color temperature correction while viewing an image indicated on the display. It is however, remarkably difficult for the operator to control two series of manipulating knobs while viewing the display screen on which a white sample image is visualized. This results from the fact that it is difficult to adjust two independent components defined on an orthogonal plane, in other words, one cannot visually identify the origin of color vectors with respect to each of red and blue color vectors, and green and purple color vectors. Accurate adjustment is therefore accomplished by means of measurement devices, such as a vectorscope. It is however not suitable to incorporate a negative-to-positive conversion apparatus including such a measurement device, requiring accurate manual adjustment, into a television camera which is designed to be suitable for home use.

A prior art telecine system for studio use is usually loaded with film which was exposed under controlled, or standard lighting conditions, rather facilitating white balance correction. With a white balance adjustment required in a negative-to-positive conversion apparatus, however, situations are much more complicated in that an image recorded on a negative film under uncontrolled lighting conditions, such as at home, is picked up by a separate image sensor under different lighting conditions to develop a television picture.

Anyway, strictly speaking, it is impossible to reproduce in detail the visual information presented by an original scene only from the limited information carried on the negative film. In the case of a telecine system for use in a broadcasting station, as discussed above, technicians skilled in correction and adjustment of television pictures imaged by a television camera may often have the pictures displayed on a picture monitor device with appropriate corrections made as to color, balance and brightness, and to highlight and shadow portions thereof, so as to be observed as in a natural condition, only by their knowledge of the limited information carried on the negative film with respect to the lighting conditions used during the exposure.

It would however hardly be expected in reproduction of images by a home-use system to have an operator perform such sophisticated operations as to require their experience on adjustment and correction of color and white balance of images to be incorporated thereinto. Difficulty in system configuration and cost is also involved in providing such a home-use system with an accurate manipulation of the color and white balance adjustment mechanism, as well as a measuring arrangement for color component vectors.

Commonly available is the type of color negative film which has a broader latitude, effecting images to be appropriately recorded thereon under a variety of exposure values with wider deviations in color balance from the standard.

In order to produce, from such a variety of images recorded on the negative film, color prints carrying positive images associated therewith, specific difficulties as discussed above do not arise since the negative film is dealt with in commercial laboratories with color and white balance corrections made by the skilled technical staff. In applying such film to a television picture reproduction system, it was very difficult to accomplish brightness and color corrections, or, at least white balance correction per se, on such a variety of images carried on the film. Variations in exposure amount may be corrected to a certain extent by making adjustment on an optical aperture of the image sensor involved in the negative-to-positive conversion system. Some kinds of subject images recorded on film, an image recorded with a larger difference in brightness through measuring the brightness of the entire field of the camera view, may make it difficult to achieve complete corrections only by means of aperture controlling.

SUMMARY OF THE INVENTION

It is therefore an object of the present invention to provide an image conversion apparatus with a simpler system configuration, free from the drawbacks discussed above on the prior art system.

More specifically, it is another object of the present invention to provide an image conversion apparatus using a conventional color television camera from which luminance and color difference signals are developed to produce color images with color correction made appropriately thereon without complicated and sophisticated operations.

In accordance with the present invention, an apparatus for use with an imaging means for imaging an image carried on an image recording medium to produce a first video signal representative of the image, wherein the first video signal includes a first luminance signal and a first color difference signal, said apparatus receiving the first video signal to convert the first video signal into a second video signal representative of an inverted image associated therewith, comprises: first signal conversion means for receiving the first luminance and color difference signals to produce first separated color signals; first signal processor means operative in response to the first luminance signal for inverting the first luminance signal and controlling a level of the inverted resultant signal to produce a second luminance signal; second signal processor means operative in response to the first separated color signals for inverting the first separated color signals and controlling a level of the inverted resultant signals to produce second separated color signals; and second signal conversion means operative in response to the second luminance and separated color signals for producing therefrom a second color difference signal.

BRIEF DESCRIPTION OF THE DRAWINGS

The objects and features of the present invention will become more apparent from the consideration of the following detailed description taken in conjunction with the accompanying drawings in which:

FIGS. 3A-3F show the waveforms appearing in the portions of the circuit shown in FIG. 2;

FIG. 4 shows, in a schematic circuit diagram, an example of the slicing and averaging circuit shown in FIG. 2.

DESCRIPTION OF THE PREFERRED EMBODIMENT

Figure 1:
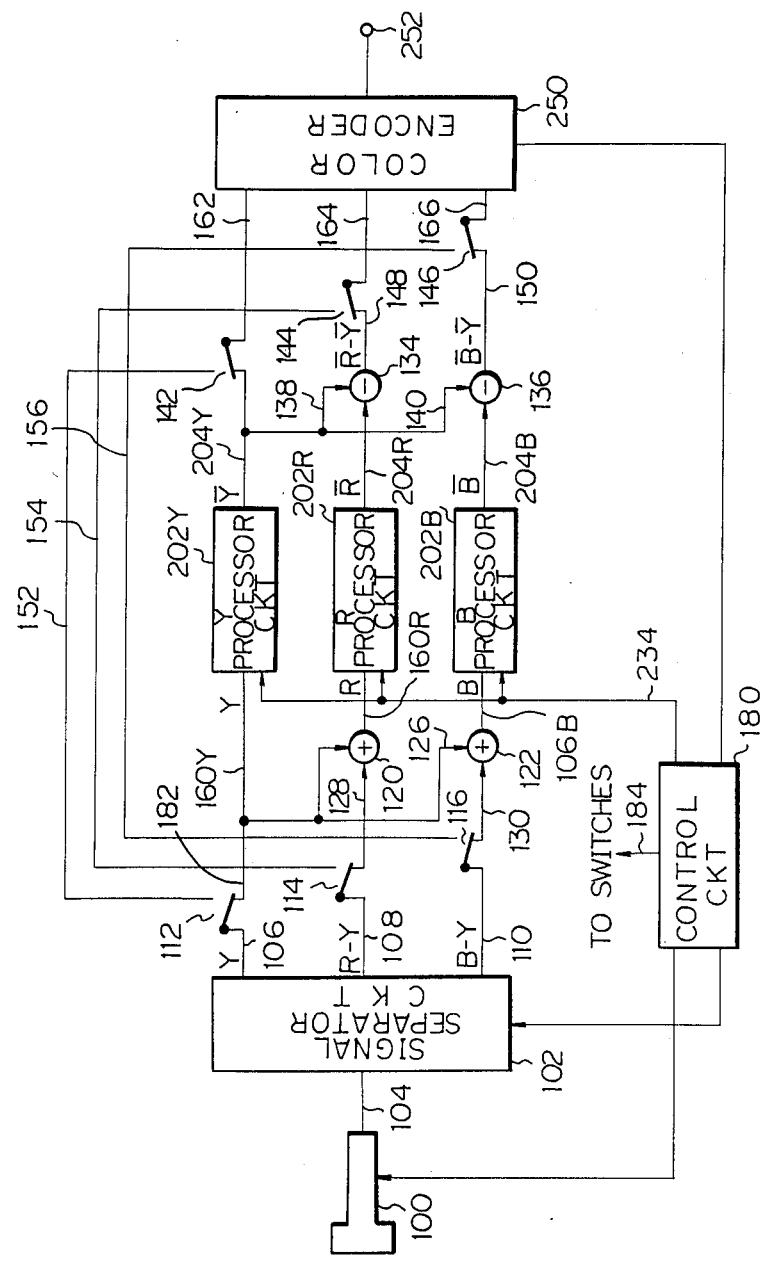
FIG. 1 is a schematic block diagram showing a preferred embodiment of a negative-to-positive conversion apparatus in accordance with the present invention.

The principle of the present invention resides in the discovery that natural reproduction of images recorded on color negative film on a television display device in terms of human eyes satisfies the following common conditions:

Three kinds of video signals including luminance, Y, and color difference signals, R-Y and B-Y, signals that are representative of a field of image are processed into luminance and two separated color signals, Y, R and B, which in turn is subjected to negative-to-positive conversion to produce inverted signals, $\overline{Y}$, $\overline{R}$ and $\overline{B}$, respectively, that are to be reproduced as a visual image on a television display screen. In such signal processing, control is made in amplitude and dc level on each of the thus separated luminance and color signals Y, R and B. The thus controlled signals will be converted into inverted luminance, $\overline{Y}$, and inverted color difference, R-Y and B-Y, which are in turn combined into the composite video signals.

On the respective separated signals, the following four processes are available:

(i) Setting, for signal processing, the level of a portion that is brightest in information carried by the respective separated signals and representative of a negative picture, i.e. the darkest portion of an original image associated therewith, at a level located toward the white level off from the black level of a standard television signal format by a predetermined level distance, the three separated signals, after being processed, being are combined into composite video signals;

(ii) Determining the darkest portion of the negative picture with respect to the respective separated signals, i.e. the brightest portion of the original picture, to process the separated signals so as to bring the level of the determined portion into the white level, the three separated signals, after being processed, are combined into composite video signals;

(iii) The two processes (i) and (ii) set forth above are combined to produce composite video signals; and (iv) In the process determining the white level, set forth in subparagraph (ii), integrating, over a field of an original picture, a portion of the video signals exceeding a predetermined level to amplify the video signals so as to make the resultant value have a predetermined value.

Accordingly, composite video signals may be formed so as to have the dark levels of the three separated signals coincident with each other, resulting in correction of the white balance of shadow portions of an original picture, whereas composite video signals may be formed so as to have the bright levels of the three separated signals coincident with each other, resulting in correction of the white balance of highlight portions of an original picture. Both of the corrections will result in correcting the white balance on both the shadow and highlight portions of the picture.

If control is made on the white balance correction of a bright portion of a picture so as to make a resultant value from the integration of portions exceeding a predetermined slicing level have a predetermined value, then it is statistically much more likely that well-balanced pictures are reproduced from a variety of negative film exposed under conditions that would cause color balance to be deteriorated, as discussed in detail later. The applicant found and experimentally determined the features described above.

With reference to FIG. 1, a negative-to-positive conversion apparatus in accordance with a preferred embodiment of the present invention includes, essentially, an imaging unit 100, such as an image pickup tube or solid-state image sensor, signal separator circuit 102, three video signal processor circuits 202Y, 202R and 202B, and color encoder 250, which are under the control of control circuit 180 for processing and producing video signals in a raster-scanning fashion.

Signal separator circuit 102 receives raster-scanned video signals produced from imaging unit 100 to separate therefrom luminance signals Y and two color difference signals R-Y and B-Y. With a commercially available television camera, a signal separator, such as circuit 102, is included together with an imaging portion, such as sensor 100, in the form of integrated circuits.

Signal separator circuit 102 has three outputs 106, 108 and 110, producing the signals Y, R-Y and B-Y, respectively. The three output ports 106, 108 and 110 are interconnected to three switches 112, 114 and 116, respectively, which may preferably be solid-state switching devices or mechanical switching contacts, which are adapted to take, all together, under the control of control circuit 180, two alternative connecting conditions: in one of which the electrical connection is made as depicted in FIG. 1, and in the other of which the electrical connection is made as opposite to the depicted states of FIG. 1. Switch 112 has one port 182 commonly connected to an input port 160Y to Y-processor circuit 202Y, and to input port 124 connected to an adder 120 commonly and to input port 126 connected to another adder 122.

Adders 120 and 122, which sum both of the inputs to produce a resultant value on their output ports 160R and 160B that are connected to the inputs to R- and B-processor circuits 202R and 202B, respectively, have the other input ports 128 and 130 connected to switches 114 and 116, respectively. Consequently, to input 160Y to Y-processor circuit 202Y, output 106 is directly applied from signal separator circuit 102, whereas to input 106R to R-processor circuit 202R, an R signal, produced from adder 120 is fed to the R-processor, and to input 106B to B-processor circuit 202B, fed is a B signal produced from adder 122 is fed to the B-processor.

Processor circuits 202Y, 202R and 202B may be substantially the same in structure, and are circuits adapted to invert input signals and clamp the levels thereof to correct the white balance of the signals to produce an inverted resultant, separated color signals, $\overline{Y}$, $\overline{R}$ and $\overline{B}$. Y-processor circuit 202Y output port 204Y is commonly connected to another switch 142, which may be the same type device as switch 112, and to input port 138 that is connected to a subtractor 134, and is connected to input port 140 that is connected to another subtractor 136.

Subtractors 134 and 136 have the other input ports 204R and 204B that interconnected to R- and B-processor circuits 202R and 202B, respectively, and also have output ports 148 and 150 interconnected to the input ports of switches 144 and 146, respectively. Those subtractors 134 and 136 are designed to subtract signals received on the one input from those of the other input thereof, and this may be done by inverting the former and adding the inverted signals to the latter. Accordingly, an inverted color difference signal $\overline{R}$-$\overline{Y}$ is produced at output port 148, while on output port 148, there is produced is an inverted color difference signal $\overline{B}$-$\overline{Y}$.

Switches 142, 144 and 146 may be the same type switches as switches 112, 114 and 116, which are together operative in response to control signals provided from control circuitry 180 on the connections collectively indicated in the figure by reference numeral 184. The remaining ports of both groups of switches 112, 114 and 116, and 142, 144 and 146 are correspondingly interconnected with each other via connections 152, 154 and 156, as depicted in the figure. The output ports 162, 164 and 166 from switches 142, 144 and 146, respectively, are interconnected to the inputs of color encoder 250.

As described earlier, switches 112, 114, 116, and 142, 144, 146 are binary-state circuits having one state depicted in the figure, and the other state opposite to the depicted state to make corresponding contact with connections 152, 154 and 156, respectively. The one and other states are alternatively chosen by the control of control circuit 180. Consequently, the luminance and color difference signals processed by processor circuits 202Y, 202R and 202B are fed to the color encoder 250"; whenever those switches take the one connection state, while the luminance and color difference signals separated and produced by separator circuit 102 are directly fed to the color encoder whenever those switches take the other connection state.

It is to be noted that while those switches are indicated in the form of mechanical contacts in the figure, and they may not necessarily be such mechanical switching but electronics functioning as such switching.

Color encoder 250 is matrix circuitry which receives on its input ports 162, 164 and 166 the luminance and color difference signals to produce therefrom composite color signals satisfying a standard color television signal format, such as the NTSC system.

Figure 2:
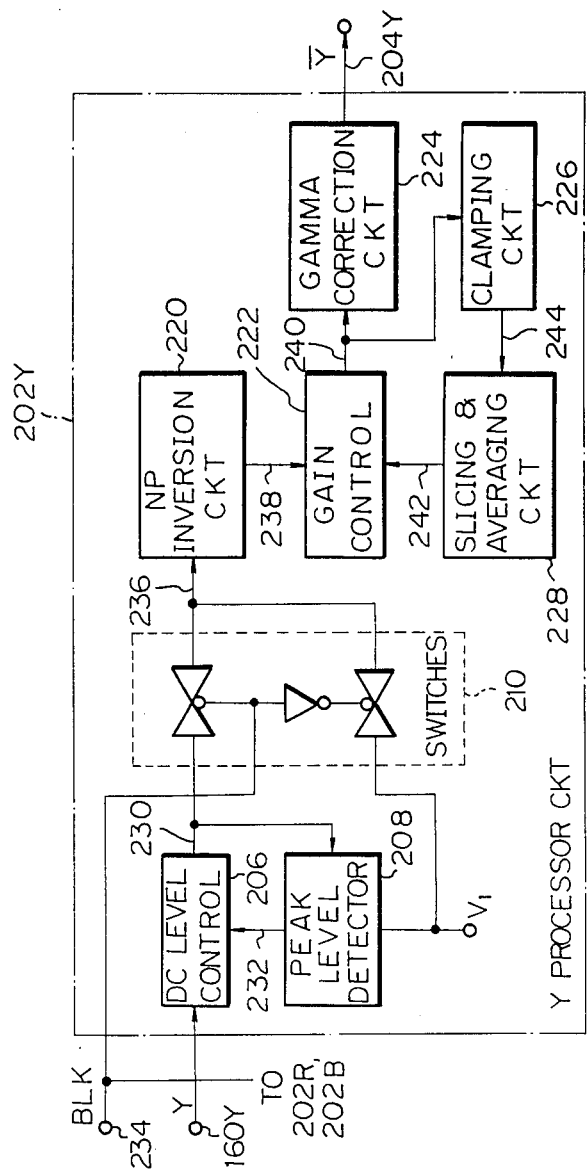
FIG. 2 shows schematically, in a block diagram, an example of one of the video signal processor circuits shown in FIG. 1.

Referring to FIG. 2, there is shown Y-processor circuit 202Y in a schematic block diagram, that is representative of the three video signal processor circuits 202Y, 202R and 202B. They may be identical with or independent of each other. Processor circuits 202Y, 202R and 202B receive on their inputs 160Y, 160R and 160B, respectively, the Y-, R- and B-signals, representative of an image formed on negative film, to invert them to produce inverted video signals $\overline{Y}$, $\overline{R}$ and $\overline{B}$. The circuit configuration may be the same, so that detailed description of processor circuit 202Y will be given below.

The processor circuit, e.g. 202Y, comprises a dc level control 206, a peak level detector 208, switches 210, a negative-to-positive (NP) inversion circuit 220, a gain control 222, a gamma ($\gamma$) correction circuit 224, a clamping circuit 226, and a slicing and averaging circuit 228. Gamma correction circuit 224 has an output, forming the output 204Y from the Y-processor circuit 202Y.

The dc level detector circuit 206 shifts the dc level of input video signal Y in response to its control input 232. Peak level detector 208 determines a peak, one extreme, of the signal produced on the output 230 from dc level control 206 to produce control signal 232 to dc level control 206 so as to bring the thus determined peak to a predetermined value. Peak level detector 208 is provided with a reference dc level V1 that defines a clamp level.

Peak level detector 208 is a maximum value detecting circuit for determining maxima in the positive or negative polarity of the signals. If peak level detector 208 is adapted to detect maxima in the positive polarity, then it shifts the level of an input signal Y as shown in FIG. 3A, for example, in which only one horizontal scanning period (1H) of the signal is shown for simplicity, so as for the peak thereof to coincide with the level V2, as shown in FIG. 3B. For example, if the video signal level has the reference of 0.7 volts, it is advantageous to set the difference V1-V2 at approximately 0.05 volts. As discussed later in detail, this gives rise to luminance control by which the black level of the signal into which the inversion is made by NP inversion circuit 220 is set to a predetermined set value, primarily making uniform the white balances of the shadow portions of a reproduced image. If peak level detector 208 is adapted to detect maxima in the negative polarity, then the white balances of the highlight portions of the reproduced image will primarily be made uniform.

Switches 210 are also provided with clamp level signal V1, as well as horizontal synchronous signals BLK, FIG. 3C, which define horizontal blanking periods of the video signals, at a a signal receiving port 234 from control circuit 180. Switches 210 are operative in response to horizontal blanking signal BLK to alternatively connect the video signals on input 230 and the clamp level signal V1 to produce on its output 236 the video output signal from dc level control 232 during the effective horizontal scanning periods, and the clamp level signals V1 during the horizontal blanking periods. The resultant wavforms produced are of the combined form of both signals, as shown in FIG. 3D.

Negative-to-positive inversion circuit 220 inverts in polarity the signal on its input 236, FIG. 3D, shifts it in level, FIG. 3E, and produce it on output 238. In accordance with one aspect of the present invention, the thus inverted signal is subject to a predetermined clamping and is fed to gamma correction circuit 224 for subsequent gamma correction. From the circuitry embodying the present invention, there are produced composite video signals in which the darkest portions, i.e. peaks, of an image reproduced along the three streams Y, R and B are separately detected to make the white balances of the darker portions of the image uniform, or, alternatively, composite video signals in which the brightest portions, i.e. peaks, of an image reproduced along the three streams Y, R and B are separately detected to make the white balances of the brighter portions of the image uniform.

In accordance with another aspect of the present invention, the inverted signals, 238 shown in FIG. 2, are supplied to gamma correction circuit 224 via gain control 222. In this system configuration, the white balance control over highlight portions may more appropriately be effected on images formed on negative film exposed under various conditions, and brightness is better controlled. More specifically, gain control 222 comprises a variable gain amplifier having a gain variable in response to the control signals received on its control input 242, thereby enabling control over the magnitude of the signals.

Advantageously, the gain may be controllable to the extent that it has the maximum gain having a ratio relative to its minimum value approximately between 1.5 and 3. For example, if the ratio is set approximately at 3, then appropriate control over white balance is accomplished to images recorded within the usual variations of lighting conditions, such as sunlight, room light, as well as images recorded on negative film exposed for the aim of special effects under artificial lighting, such as a stage shooting. This depends upon the fact that the sunlight includes primary color components B, G and R substantially equally, whereas, artificial light emanating from a tungsten lamp, for example, includes the red component approximately triple as much as blue the component.

The gain control input 242 is fed to gain control 222 via clamp circuit 226 and slicing and averaging circuit 228 decided from the output 240 from gain control 222. Through the feedback loops, the magnitude of the respective separated color signals are adjusted to correct the white balance of the resultant color composite signals in the manner as described later. It is advantageous to design the circuitry to effect manual adjustment of the white balance.

Gamma correction circuit 224 is a gradation corrector circuit for compensating for a gradation or tone provided by the negative film and imaging unit 100 involved. More specifically, correction circuit 224 is adapted to correct the gamma involved so as to put the gray scale of a reproduced image represented by the video signals on a straight line. Dependent upon the types of imaging devices, the value of gamma may be set to a value included in the range spanning between 0.5 and 2.0 in accordance with the broken line approximation.

Clamping circuit 226, and slicing and averaging circuit 228 form a feedback loop for feeding the output 240 from gain control 222 to its control input 242. Clamping circuit 226 clamps the output 240 from gain control 222, i.e. the dc level of the signals resultant from the negative-to-positive inversion, FIG. 3E, to a predetermined level, e.g. zero volt in the instance, see FIG. 3F. The signal with its black level clamped, FIG. 3F, is supplied to slicing and averaging circuit 228 on its input 244.

Slicing and averaging circuit 228 slices the signal with its black level clamped, FIG. 3F, by a predetermined slicing level Vs, and integrates the portions of the signals exceeding the slicing level, i.e. the hatched portions 300 shown in FIG. 3F, thereby averaging them over the horizontal scanning periods.

A specific circuit configuration of slicing and averaging circuit 228 is shown in FIG. 4, which comprises two diodes D1 and D2 for setting a slice level Vs, a capacitor C1 for cutting dc components, and an integrator formed of a capacitor C2 and a resistor R1. As may be seen therefrom, the averaging operations are accomplished by integration by means of a charging capacitor C2, and smoothing by means of discharging therefrom to resistor R1. If the slice level is set identically with the clamping level, then the system will be equivalent to the so-called total integration, which adjusts the maximum values of the integrated results of the signals to a predetermined value.

Slicing and averaging circuit 228 may be so designed that the slicing level Vs is variable in repsonse to a manual operation. The slicing level Vs may advantageouly be approximately 50–90 percent, more preferably about 70 percent, of the aimed peak signal voltage presented on the output 240 from gain control 222. The parameters involved in integrator cicuit composed of capacitor C2 and resistor R1 may be selected in such a manner that the voltage produced on its output 242, i.e. the voltage associated with the mean area of the portions 300, FIG. 3F, is fed to the gain control input 242 to gain control circuit 222 to have its gain controlled, thereby bringing the resultant mean value substantially to the predetermined value.

With respect to a pattern of distribution of output video signals processed and representative of a field of image, characteristic features of the peak control system, slice integration system, and total integration system, which may be a specific case of the slicing and integration system will hereinafter be described.

Figure 5A:
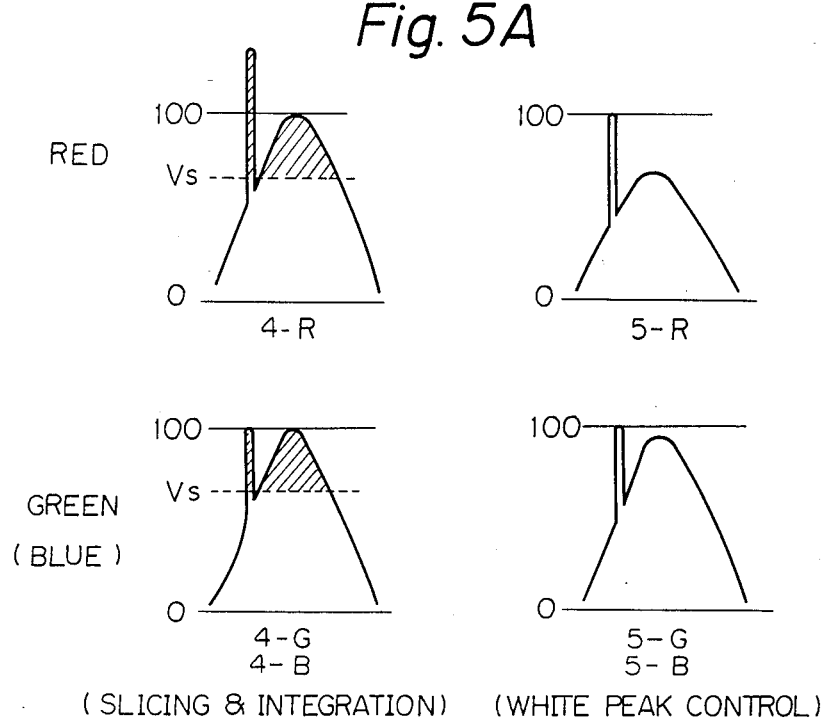
FIGS. 5A, 5B and 6 are the waveforms representative of a horizontal scanning line of images, useful for understanding the operations of the preferred embodiment in accordance with the present invention.

Now reference will be made to FIGS. 5A and 5B. FIG. 5A shows the video signals of a horizontal scanning line representative of a picture having a red bright spot within the field. In the figures, numerals 0 and 100 represent the black and white levels, respectively, of the video signals, expressed in a relative output video signal scale. The dotted line in between designates the slicing level Vs.

It can be seen from those figures that in the case of the slicing and integration system the signals are processed so that the area of the portion exceeding the slicing level Vs of the green and blue components, i.e. the hatched portions shown in sections 4-G and 4-B, is substantially equal to the area of the portion of the red component, i.e. the hatched portion of the section 4-R, with satisfactory color balance being obtained. In the case of the white peak control system, however, the impulsive peak of the red component is restricted into the level 100, see section 5-R, whereas the signal peaks, associated with the red bright spot, involved in the green and blue components are not so high as that of the brightest portions of the picture except the light spot. Therefore, as shown in section 5-G and 5-B, both portions will be produced approximately at level 100, causing only the red component signal to be totally reduced in level so that the reproduced visible image will be poor in red component with cyan emphasized in color balance.

Figure 5B:
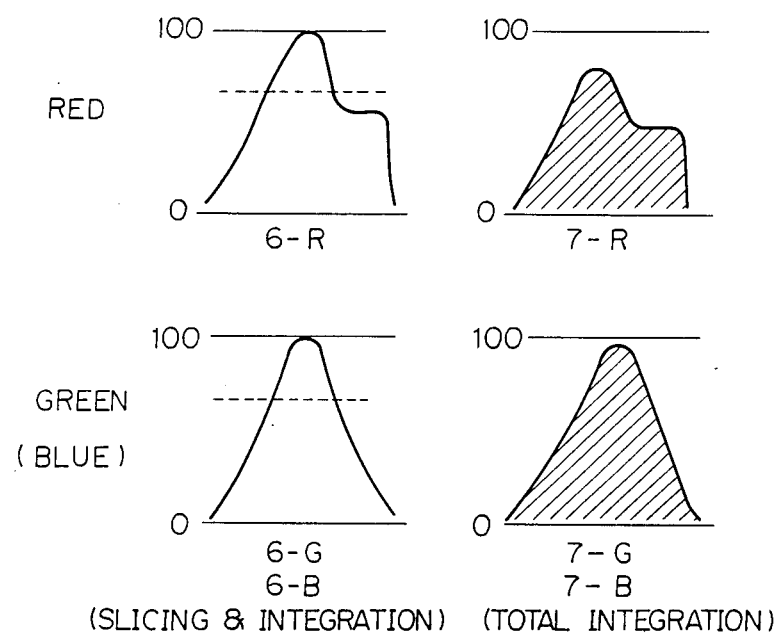

FIG. 5B shows, by signals of a horizontal scanning line, an example of another picture including a red portion having a significantly larger area at the medium brightness. This situation does not cause any difficulties in the case of the slice integration system. In the case of the total integration system, however, the red component signal is operated on as depicted in section 7-R with its hatched portion equal in area to the hatched portions of green and blue portions. In the latter case, therefore, only the level of the red component will be reduced. Under the situations associated with FIG. 5B, the peak control system is not effective, although not shown in the figures, in adjusting into three well-balanced color components, R, G and B, as in the case of the slicing and integration system.

Figure 6:
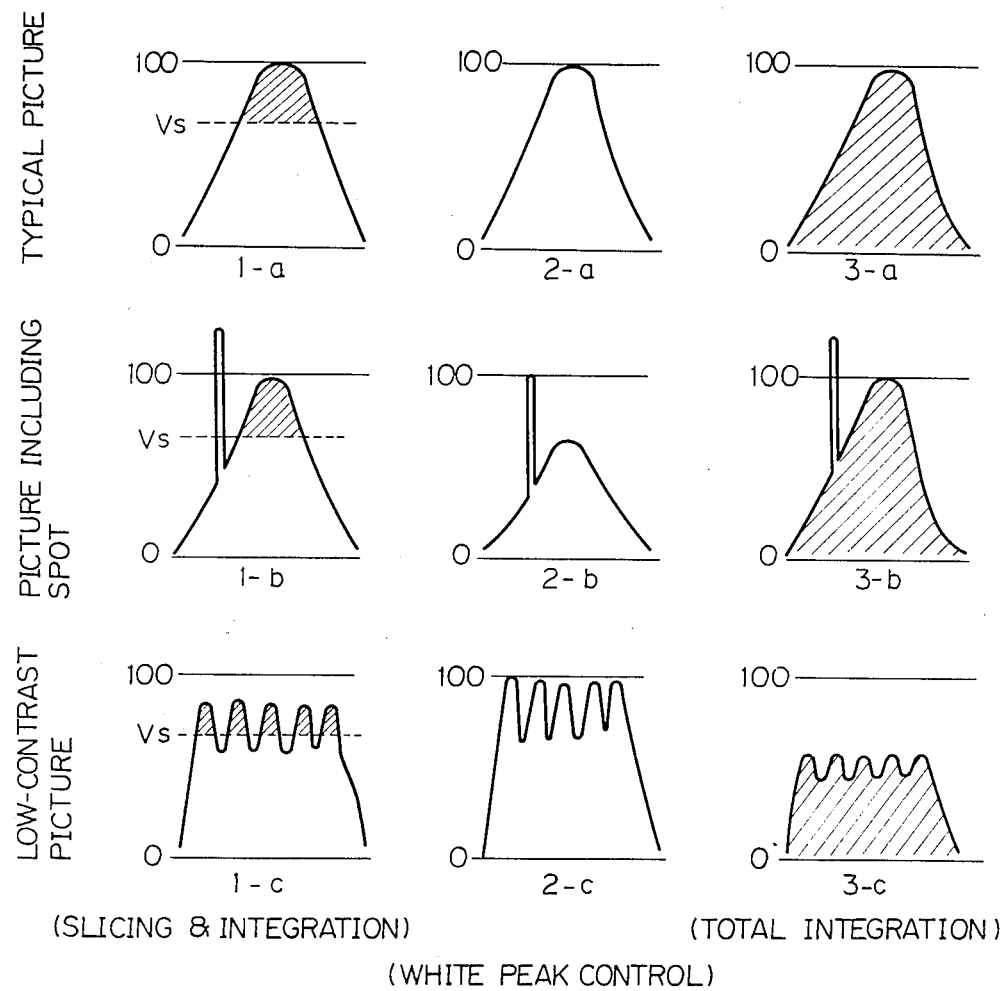

FIG. 6, which is similar to FIGS. 5A and 5B, is useful for understanding the brightness control in the cases of the slicing and intgration system, white peak control system and total or entire integration system in terms of a standard picture, a picture including a bright spot, and low-contrast picture, exemplarily shown therein as typically obtained in the usual situations. The figures reveal that with respect to the standard picture the three types of control, slicing and integration, white peak control and total integration systems, do not provide a significant difference in the output levels. They appear to be substantially the same, as shown in sections 1-*a*, 2-*a* and 3-*a*.

In the case of the picture including a light spot, the integration systems associated with sections 1-*b* and 3-*i* b raise no difficulties, whereas the white peak control system results in reducing the brightness of the entire picture area, as seen from section 2-*b*. In addition, in the case of the picture which is low in contrast all over the entire area, the slicing and integration and white peak control systems raise no problems, but the total integration system causes the total brightness to be reduced, as clearly be seen from sections 1-*c*, 2-*c*, 3-*c*.

As described in detail, the slicing and integration technique in accordance with the present invention causes the gain of the gain control circuit 222 to be adjusted so as to maintain the area of the portion 300, FIG. 3, that exceeds the slice level Vs, after averaging, approximately equal to a pedetermined value, FIG. 3F. Integration and averaging are performed on the entire field of video signals with respect to the hatched portions 300, namely, with respect to the brighter portions, to perform the signal processing so as to keep the resultant integrated value to a predetermined value. Automatic adjustment will be accomplished on the white balance and brightness with improved stability.

As discussed earlier, the three processor circuits 202Y, 202R and 202B are provided with respect to separated signals Y, R and B, with the signal processing described above being performed independently of each other. Consequently, color encoder 250, which combines the outputs 204Y, 204R and 204B from those processor circuits, produces, on its output 252, composite video signals with white balance corrected appropriately. For example, when a negative film carrying a field of image information, from which a white image will be produced after inversion, output 252 is develops a composite video signal containing the separated components B, G and R with approximately equal amount therebetween. Additionally, it is possible to determine the black and white levels only from the image information carried by a negative film on which recorded is a field of image having no genuine black or white portion.

Color encoder 250 is adapted to present on the output 252 thereof the composite video signal in the form of a standard color television format, such as the NTSC system, from the thus inverted video signals, that is to say, the video signals Y, R-Y and B-Y representative of a positive image into which an associated negative image carried on a negative film has been converted. Therefore, reproduction of the video signals, produced on output 252, on a display screen of a color television monitor will provide visual images which are appropriately corrected in white balance. In the illustrative embodiment, when imaging unit 100 picks up an ordinary object rather than negative film, swithes 112, 114, 116 and 142, 144, 146 will, under the control of control circuit 180, take the other connecting state, in which the image signals representative of such a positive image are transferred directly to color encoder 250, in which they are in turn converted into a standard format color television signals.

The present invention is not resricted to the illustrative, particular embodiment. In the embodiment, the black level of the inverted signals is clamped. Clamping may however not be necessarily effected on a black level but a white level, i.e. the peaks in the negative polarity of the signals, before being inverted. In addtion, color separation may not be necessarily made on the combination of the colors referred to the illustrative embodiment, but on other combinations, such as of white (W), yellow (Ye) and cyan (Cy), for example.

The present invention may of course be applicable to not only a still image reproduction but equally to movie reproduction. In the case of a movie, or telecine system, it is advantageous to design the integration circuit so as to have a time constant involved in the feedback loop thereof larger than that in the case of the still reproduction. This is so as to avoid the effects due to the white balance of the total field of image under reproduction, which would otherwise occur whenever a relatively brighter region is partially involved in the subject scene.

In accordance with the present invention, a negative-to-positive conversion of color images upon reproduction is accomplished with appropriately corrected color, by circuitry which is relatively simple in structrure using a commercially available, television camera producing luminance and color difference signals.

The imaging system in accordance with the present invention may be applicable to a regular television camera system without passing the video signals to the video signal processing circuitry. When the system is applied to picking up images formed on negative film, the video signals developed from the imaging unit is conducted to the video signal processing circuitry, effecting negative-to-positive conversion, with an improved color balance accomplished regardless of the lighting conditions performed on the exposure of fields of images carried by the film. Consequently, in the latter case, the automatic control over white balances as well as the brightness levels will appropriately be accomplished on the fields of images recorded under various lighting conditions, in a broader dynamic range of reproduction.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. Apparatus for use with imaging means that detects an image that is carried on an image recording medium and produces a first video signal representative of the image, wherein the first video signal includes a composite of a first luminance signal and a first color difference signal, the apparatus receiving the first video signal and converting the first video signal into a second video signal representative of a negative of the image associated therewith, comprising:
   first signal conversion means for receiving the composite of the first luminance and color difference signals to produce first separated color signals including a first luminance separated color signal and a first color difference separated color signal;
   first signal processor means, operative in response to the first luminance separated signal, for inverting the first luminance separated signal and controlling a level of the inverted first luminance separated signal to produce a second luminance signal;
   second signal processor means operative in response to the first separated color signals for inverting the first separated color signals and controlling a level of the inverted first separated color signals to produce second separated color signals; and
   second signal conversion means operative in response to the second luminance and the second separated color signals for producing therefrom a second color difference signal.

2. Apparatus in accordance with claim 1, wherein said image recording medium has the image recorded thereon in the form of a negative image.

3. Apparatus in accordance with claim 2, further comprising encoder means operative in response to the second luminance and separated color signals for producing therefrom a composite color video signal.

4. Apparatus in accordance with claim 3, further comprising switching means for selectively applying the first luminance separated and first separated color signals, and the second luminance and second separated color signals to said encoder means;
   said switching means introducing the second luminance and second color difference signals to said encoder means whenever taking a first state, and introducing the first luminance separated and color difference separated signals to said encoder means whenever taking a second state.

5. Apparatus in accordance with claim 2, wherein:
   said first processor means comprises first inversion means, operative in response to the first luminance separated signal, for inverting the first luminance separated signal, and clamping means, operative in response to the first luminance separated signal, for holding an extreme value of the inverted first luminance separated signal to a first predetermined level; and
   said second processor means comprises second inversion means, operative in response to the first separated color signals, for inverting the first separated color signals, and second clamping means operative in response to the first separated color signals for holding a second extreme value of the inverted first separated color signals to the first predetermined level, whereby the second video signal is produced, the second video signal being representative of a positive image having corrected brightness.

6. Apparatus in accordance with claim 5, wherein the extreme value and second extreme value comprise peak values of a negative polarity for the respective inverted signals.

7. Apparatus in accordance with claim 5, wherein the extreme value and the second extreme value comprise peak values of a positive polarity for the respective inverted signals.

8. Apparatus in accordance with claim 5, wherein the extreme value and the second extreme value comprise peak values in the negative and positive polarities of the respective inverted signals, the first predetermined level being set in association with the peak values.

9. Apparatus in accordance with claim 5, wherein:
   said first and second processor means both further comprise variable gain amplifier means, interconnected to respective inversion means, for amplifying an output signal from said respective inversion means;
   said first and second processor means both further comprising integrating and averaging means, interconnected to said respective inversion means and respective clamping means, for producing a gain control signal representative of an integrated and averaged value of a portion of the inverted and clamped signal of the respective processor means exceeding a second predetermined level;
   said variable gain amplifier means controlling its gain to be changed in response to a gain control signal, whereby the second video signal is produced which is representative of a positive image having corrected white balance.

10. Apparatus for use with an imaging means that detects a negative image carried on a negative image recording medium and produces a first video signal representative of the negative image, wherein the first video signal includes a composite of a first luminance signal and a first color difference signal, the apparatus receiving the first video signal to convert the first video signal into a second video signal representative of a positive image associated therewith, comprising:
   first signal conversion means for receiving the composite of the first luminance and color difference signals and producing first separated color signals that include a first luminance separated color signal and a first color difference separated color signal;
   first signal processor means operative in response to the first luminance separated signal for inverting the first luminance separated signal and controlling a level of the inverted first luminance separated signal to produce a second luminance signal;

second signal processor means, operative in response to the first separated color signal, for inverting the first separated color signals and controlling a level of the inverted first separated color signals to produce second separated color signals;

second signal conversion means, operative in response to the second luminance and second separated color signals, for producing therefrom a second color difference signal; and encoder means, operative in response to the second luminance and second color difference signals, for producing the second video signal.

11. Apparatus in accordance with claim 10, wherein said encoder means produces a composite color video signal as the second video signal.

12. Apparatus in accordance with claim 10, further comprising switching means for selectively applying the first luminance separated and first separated color signals, and second luminance and second separated color signals to the encoder means;

said switching means introducing the second luminance and second separated color signals to said encoder means whenever taking a first state, and introducing the first luminance separated and first separated color signals to said encoder means whenever taking a second state.

13. Apparatus in accordance with claim 10, wherein:
said first processor means comprises first inversion means, operative in response to the first luminance separated signal, for inverting the first luminance separated signal, and clamping means operative in response to the first luminance separated signal for holding an extreme value of the inverted first luminance separated signal to a first predetermined level;

said second processor means comprises second inversion means, operative in response to the first separated color signals, for inverting the first separated color signals, and clamping means, operative in response to the first separated color signals, for holding an extreme value of the inverted first separated color signals to a first predetermined level, whereby the second video signal is produced which is representative of a positive image having corrected brightness.

14. Apparatus in accordance with claim 13, wherein the extreme value comprises a peak value of a negative polarity for the respective inverted signals.

15. Apparatus in accordance with claim 13, wherein the extreme value comprises a peak value of positive polarity for the respective inverted signals.

16. Apparatus in accordance with claim 13, wherein the extreme value comprises peak values in the negative and positive polarities for the respective inverted signals, the first predetermined level being set in association with the peak values.

17. Apparatus in accordance with claim 13, wherein:
said first and second processor means both further comprise variable gain amplifier means, interconnected to respective inversion means, for amplifying an output signal from said respective inversion means;

said first and second processor means further comprising integrating and averaging means interconnected to said respective inversion means and respective clamping means for producing a gain control signal representative of an integrated and averaged value of a portion of the inverted and clamped signal of the respective processor means exceeding a second predetermined level;

said variable gain amplifier means controlling its gain to be changed in response to a gain control signal, whereby the second video signal is produced which is representative of a positive image having corrected white balance.

* * * * *